US012795413B2

(12) United States Patent
Takeda et al.

(10) Patent No.: US 12,795,413 B2
(45) Date of Patent: Nov. 10, 2026

(54) LTE-CRS BASED RATE-MATCHING OR PUNCTURING FOR NR PDCCH

(71) Applicant: QUALCOMM Incorporated, San Diego, CA (US)

(72) Inventors: Kazuki Takeda, Tokyo (JP); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1029 days.

(21) Appl. No.: 17/542,253

(22) Filed: Dec. 3, 2021

(65) Prior Publication Data

US 2023/0180031 A1 Jun. 8, 2023

(51) Int. Cl.

| | |
|---|---|
| ***H04W 24/08*** | (2009.01) |
| ***H04L 5/00*** | (2006.01) |
| ***H04W 72/044*** | (2023.01) |
| ***H04W 72/23*** | (2023.01) |

(52) U.S. Cl.

CPC ........... *H04W 24/08* (2013.01); *H04L 5/0007* (2013.01); *H04L 5/0051* (2013.01); *H04W 72/044* (2013.01); *H04W 72/23* (2023.01)

(58) Field of Classification Search

CPC ... H04W 24/08; H04W 72/23; H04W 72/044; H04L 5/0007; H04L 5/0051

USPC .......................................................... 370/329

See application file for complete search history.

(56) References Cited

U.S. PATENT DOCUMENTS

2012/0263117 A1* 10/2012 Love ..................... H04W 72/23 370/328
2012/0263118 A1* 10/2012 Love ................. H04W 72/1215 370/329
2020/0053758 A1 2/2020 Hosseini et al.
2020/0145982 A1* 5/2020 Cheng ................... H04L 5/0053
2020/0351638 A1* 11/2020 Kim ........................ H04W 8/22
2021/0045147 A1* 2/2021 Zhou ................. H04W 52/0235

(Continued)

FOREIGN PATENT DOCUMENTS

EP 4009566 A1 6/2022
WO 2021020840 A1 2/2021
WO 2021118192 A1 6/2021

OTHER PUBLICATIONS

International Search Report and Written Opinion—PCT/US2022/080768—ISA/EPO—Apr. 5, 2023, 12 Pages.

(Continued)

*Primary Examiner* — Hermon Asres

(74) *Attorney, Agent, or Firm* — Shumaker & Sieffert, P.A.

(57) ABSTRACT

Certain aspects of the present disclosure provide techniques for adjusting PDCCH processing or PDCCH DMRS processing, such as to avoid cell-specific reference signal (CRS) of long-term-evolution (LTE). For example, a UE may adjust at least one of physical downlink control channel (PDCCH) processing or PDCCH demodulation reference signal (DMRS) processing of a first radio access technology (RAT), such as LTE, based on whether one or more resource elements (REs) of a PDCCH candidate in a PDCCH monitoring occasion of the first RAT is configured as overlapping with one or more REs of a CRS of a second RAT, such as 5G new radio (NR). The UE then monitors PDCCH candidate in the PDCCH monitoring occasion based on the adjusting.

22 Claims, 14 Drawing Sheets

(56) References Cited

U.S. PATENT DOCUMENTS

| | | | |
|---|---|---|---|
| 2022/0264464 A1 | 8/2022 | Seo et al. | |
| 2023/0081776 A1 | 3/2023 | Kim et al. | |

OTHER PUBLICATIONS

Nokia, et al., "Extension of the Dynamic Spectrum Sharing (DSS) WID", 3GPP TSG RAN meeting #89, RP-201761, 3rd Generation Partnership Project, Mobile Competence Centre, 650, Route Des Lucioles, F-06921 Sophia-Antipolis Cedex France, vol. TSG RAN, No. e-Meeting, Sep. 14, 2020-Sep. 18, 2020, Sep. 7, 2020, XP051931560, 3 Pages.

* cited by examiner

All 4 Monitoring Occasions are Based on the Same Search Space/CORSET but have Different Patterns

LTE-CRS BASED RATE-MATCHING OR PUNCTURING FOR NR PDCCH

INTRODUCTION

Aspects of the present disclosure relate to wireless communications, and more particularly, to techniques for dynamic spectrum sharing (DSS).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method includes adjusting at least one of physical downlink control channel (PDCCH) processing or PDCCH demodulation reference signal (DMRS) processing of a first radio access technology (RAT). The adjusting is based on whether one or more resource elements (REs) of a PDCCH candidate in a PDCCH monitoring occasion of the first RAT is configured as overlapping with one or more REs of a cell-specific reference signal (CRS) of a second RAT. The method further includes monitoring the PDCCH candidate in the PDCCH monitoring occasion based on the adjusting.

One aspect provides an apparatus for wireless communications. The apparatus includes a memory and a processor coupled with the memory. The processor and the memory configured to adjust at least one of PDCCH processing or PDCCH DMRS processing of a first RAT, based on whether one or more REs of a PDCCH candidate in a PDCCH monitoring occasion of the first RAT is configured as overlapping with one or more REs of a CRS of a second RAT. The processor and the memory are further configured to monitor the PDCCH candidate in the PDCCH monitoring occasion based on the adjusting.

One aspect provides a non-transitory computer readable medium storing instructions that when executed by a UE cause the UE to adjust at least one of PDCCH processing or PDCCH DMRS processing of a first RAT, based on whether one or more REs of a PDCCH candidate in a PDCCH monitoring occasion of the first RAT is configured as overlapping with one or more REs of a CRS of a second RAT.

The non-transitory computer medium stores instructions that when executed by a UE cause the UE to monitor the PDCCH candidate in the PDCCH monitoring occasion based on the adjusting.

One aspects provides an apparatus for wireless communications. The apparatus includes means for adjusting at least one of PDCCH processing or PDCCH DMRS processing of a first RAT, wherein the adjusting is based on whether one or more REs of a PDCCH candidate in a PDCCH monitoring occasion of the first RAT is configured as overlapping with one or more REs of a CRS of a second RAT. The apparatus further includes means for monitoring the PDCCH candidate in the PDCCH monitoring occasion based on the adjusting.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for adjusting PDCCH processing or PDCCH DMRS processing, such as to avoid cell-specific reference signal (CRS) of long-term-evolution (LTE).

Conventionally, a user equipment (UE) may not monitor a PDCCH candidate if at least one resource element (RE) of a PDCCH candidate for the on the serving cell is configured to overlap with at least one RE of an LTE CRS. According to aspects of the present disclosure, however, the UE may nonetheless monitor the PDCCH candidate, thus enhancing resource utilization and performance in dynamic spectrum sharing (DSS)

For example, a UE may adjust at least one of physical downlink control channel (PDCCH) processing or PDCCH demodulation reference signal (DMRS) processing of a first radio access technology (RAT), such as LTE, based on whether one or more resource elements (REs) of a PDCCH candidate in a PDCCH monitoring occasion of the first RAT is configured as overlapping with one or more REs of a cell-specific reference signal (CRS) of a second RAT, such as 5G new radio (NR). The UE then monitors PDCCH candidate in the PDCCH monitoring occasion based on the adjusting.

According to aspects of the present disclosure, the UE may, for a same search space or control resource set (CORESET), apply at least one of NR PDCCH rate-matching, puncturing, or NR PDCCH demodulation reference signal (DMRS) adjustment, for avoiding LTE-CRS RE(s). This may depend on whether the monitoring occasion for the PDCCH candidate overlaps with LTE-CRS RE(s). In some cases, for the same search space or CORESET, the adjustment may be common across monitoring occasions in a slot. In some cases, the adjustment may apply to all, or a subset of, physical resource blocks (PRBs) of the search space or CORESET. The UE may report what specific such adjustments the UE supports per downlink cell or bandwidth part (BWP). Details of these aspects are further discussed below.

Introduction to Wireless Communication Networks

Figure 1:
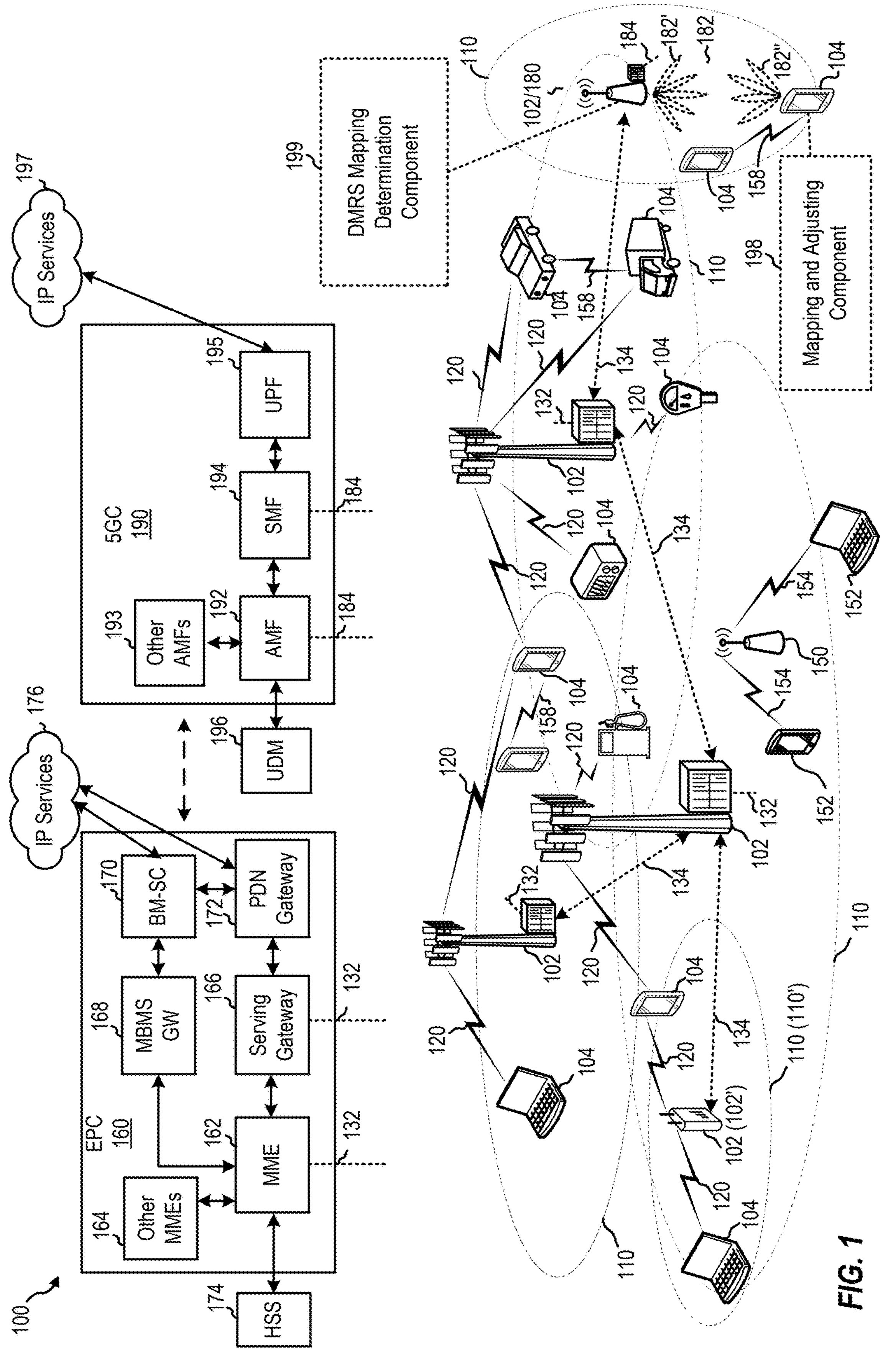
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes DMRS mapping determination component 199, which may be configured to map PDCCH DMRS of a first RAT to a CORESET based on whether CRS of a second RAT overlaps at least partially with the CORESET. Wireless communication network 100 further includes mapping and adjusting component 198, which may be used configured to adjust at least one of PDCCH processing or PDCCH DMRS processing.

Figure 2:
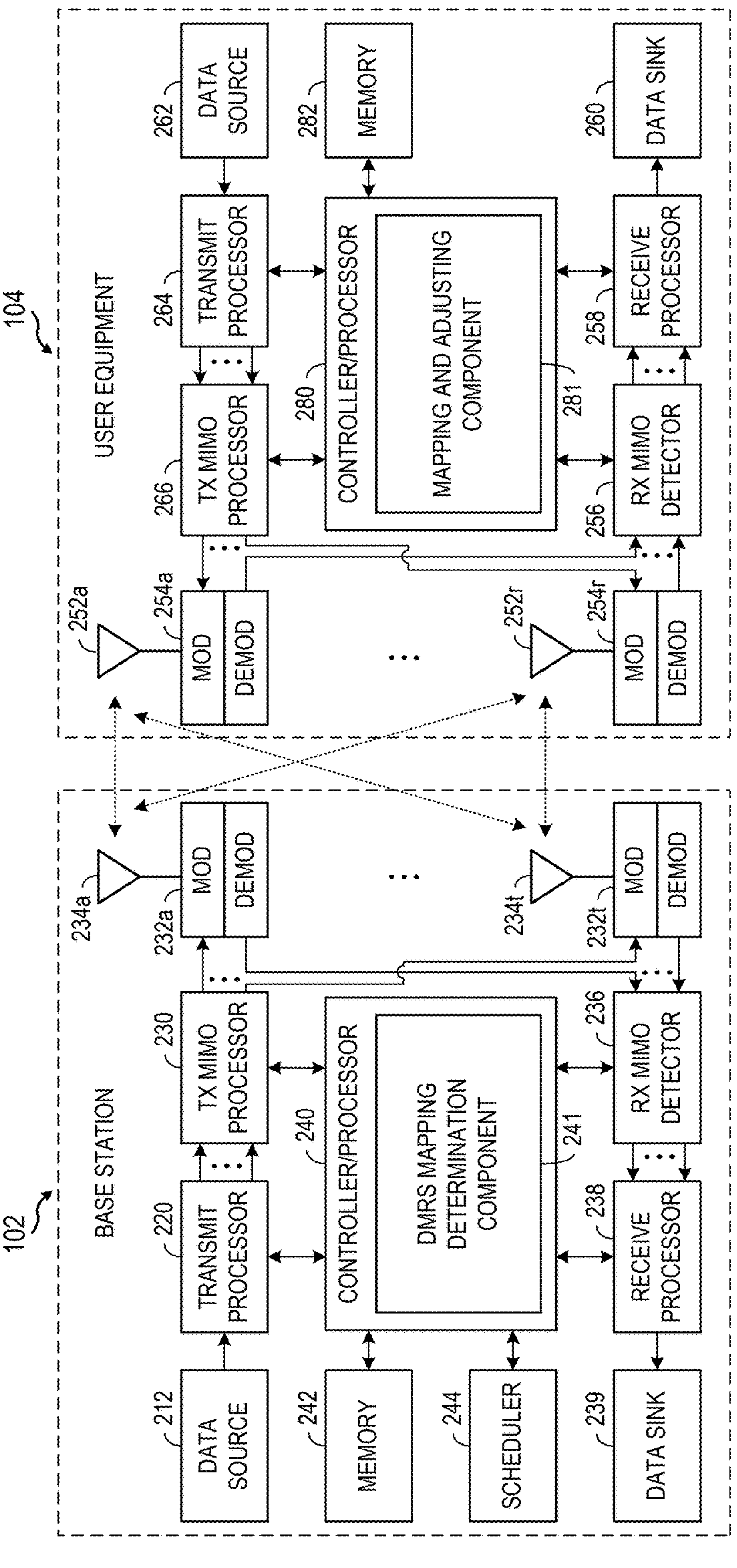
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes DMRS mapping determination component 241, which may be representative of DMRS mapping determination component 199 of FIG. 1. Notably, while depicted as an aspect of controller/processor 240, DMRS mapping determination component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes mapping and adjusting component 281, which may be representative of mapping and adjusting component 198 of FIG. 1. Notably, while depicted as an aspect of controller/processor 280, mapping and adjusting component 281 may be implemented additionally or alternatively in various other aspects of UE 104 in other implementations.

Figure 3A:
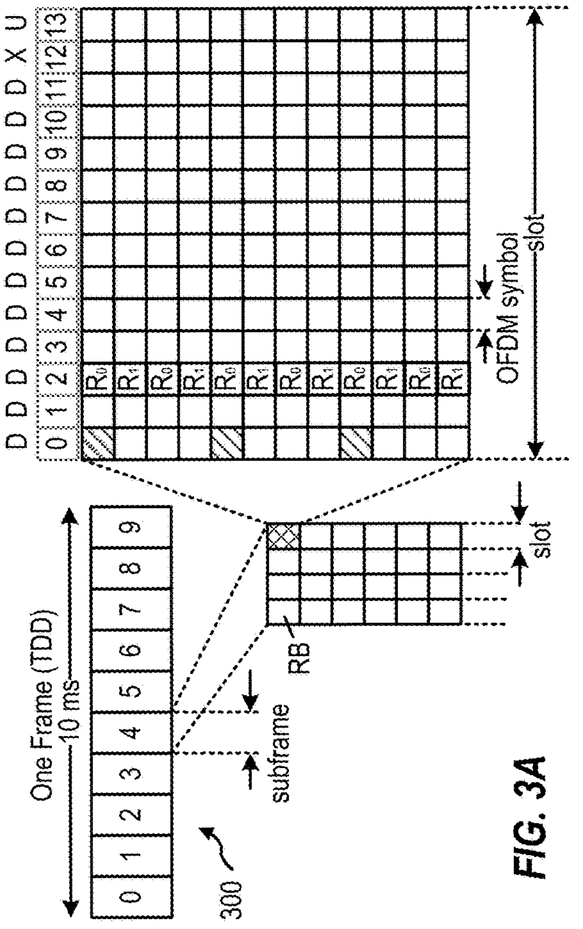
FIGS. 3A, 3B, 3C, and 3D depict various example aspects of data structures for a wireless communication network.
Figure 3B:
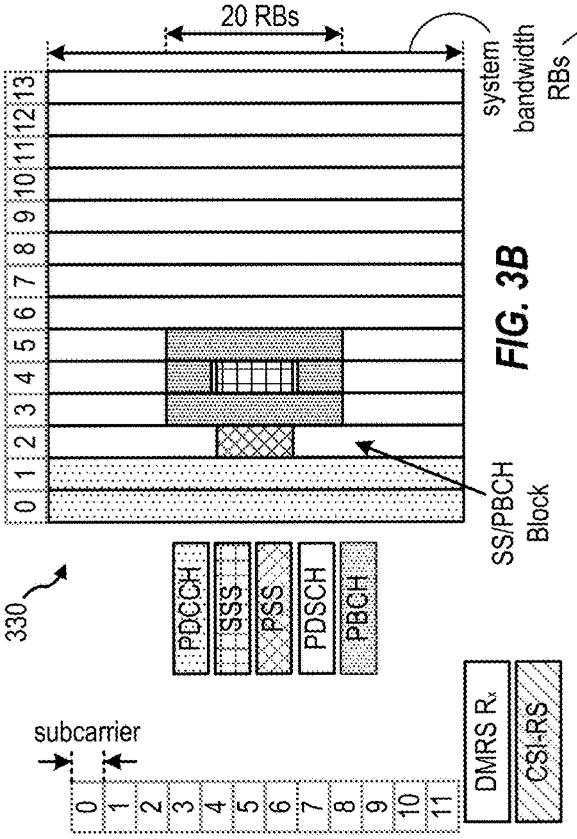
Figure 3C:
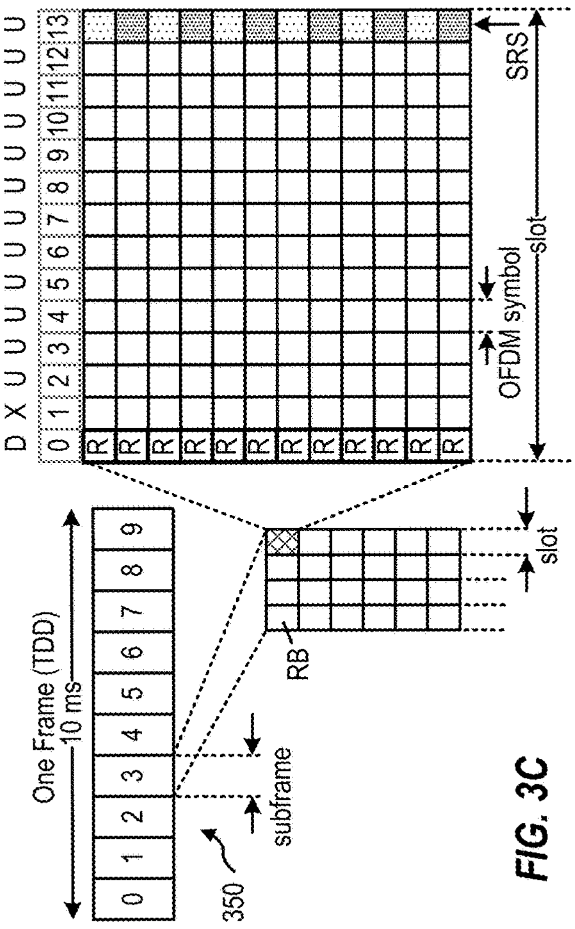
Figure 3D:
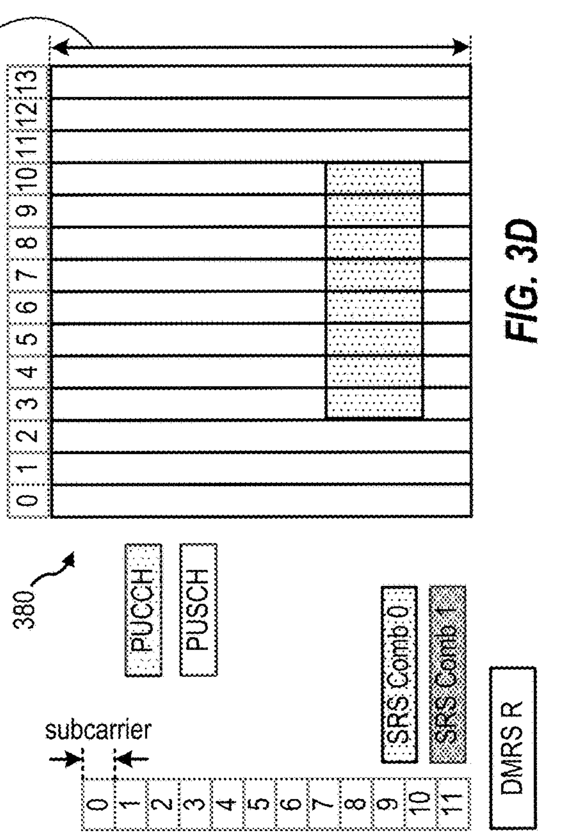

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHZ, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHZ, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mm Wave/near mmWave radio frequency band (e.g., 3 GHZ-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, in dynamic spectrum sharing, when the time-frequency resources in the carrier are dynamically assigned to either LTE or NR according to respective traffic demands, the UE may adjust PDCCH processing or PDCCH DMRS processing to optimize resource allocation, allowing for flexible spectrum sharing and integration of two or more RATs.

Aspects Related to Dynamic Spectrum Sharing (DSS)

Figure 4:
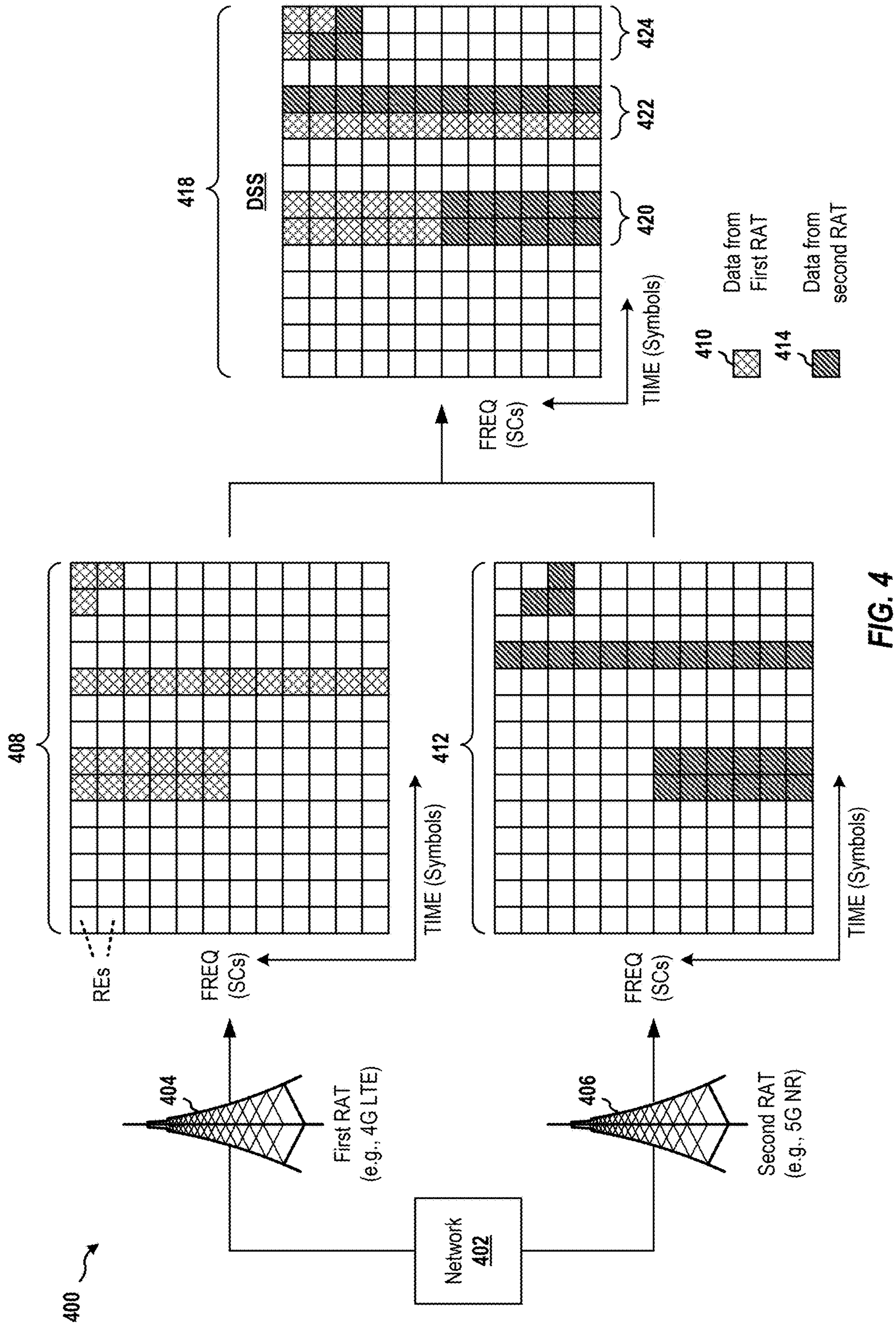
FIG. 4 is a diagram illustrating an example of dynamic spectrum sharing (DSS) in accordance with various aspects of the present disclosure.

FIG. 4 is a diagram 400 illustrating an example of dynamic spectrum sharing (DSS) in accordance with various aspects of the present disclosure. A network 402 may be operating with a first RAT (e.g., 4G LTE) and a second RAT (5G NR), where the network may transmit transmissions (e.g., data) for wireless devices supporting the first RAT from a first base station 404 (e.g., a 4G LTE base station), and the network may transmit transmissions for wireless devices supporting the second RAT from a second base station 406 (e.g., a 4G LTE base station). For example, as shown at 408, the first base station 404 may transmit data 410 to wireless devices supporting the first RAT (e.g., 4G LTE UEs) using a first set of resources of a slot/subframe, and as shown at 412, the second base station 406 may also transmit data to wireless devices supporting the second RAT (e.g., 5G NR UEs) using a second set of resources (e.g., non-overlapping resources) of the slot/subframe. As such, as shown at 418, based on the DSS, the first base station 404 and the base station 406 may transmit data using same time or frequency resources in a slot/subframe. In one example, as shown at 420, the first base station 404 and the base station 406 may transmit data using same time resources in a slot/subframe based on frequency division multiplexing (FDM), e.g., data from the first base station 404 and the base station 406 are being transmitted at the same time but using different frequency bands in the slot/subframe. In another example, as shown at 422, the first base station 404 and the base station 406 may transmit data using same frequency resources in a slot/subframe based on time division multiplexing (TDM), e.g., data from the first base station 404 and the base station 406 are transmitted using a same frequency band but at different times (e.g., symbols). In another example, as shown at 424, the first base station 404 and the base station 406 may transmit data based on a combination of both FDM and TDM in a slot/subframe.

Under DSS, a UE may be configured to monitor and receive (e.g., decode) data/signals transmitted from the RAT it supports. For example, if a network supports both 5G NR and 4G LTE, the network may be configured to use an NR base station to transmit NR signals and use an LTE base station to transmit LTE signals on a same carrier. Under such configuration, an NR UE (e.g., a UE that supports 5G NR) may be configured to receive/monitor the NR signals but not the LTE signals, and an LTE UE (e.g., a UE that supports 4G LTE) may be configured to receive/monitor the LTE signals but not the NR signals, etc.

Figure 5:
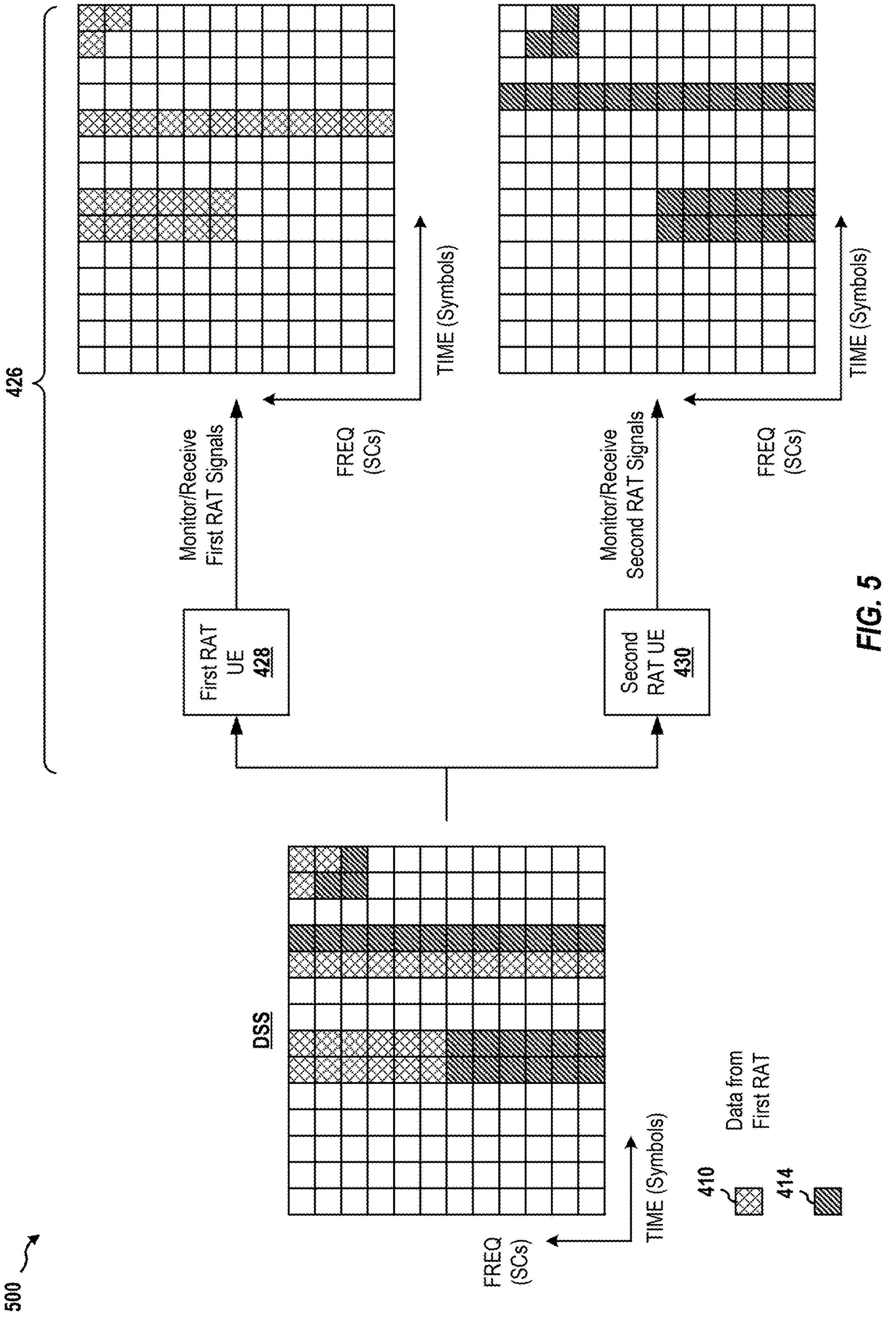
FIG. 5 is a diagram illustrating an example of UEs receiving data under DSS in accordance with various aspects of the present disclosure.

FIG. 5 is a diagram 500 illustrating an example of UEs receiving data under DSS in accordance with various aspects of the present disclosure. As shown at 426, a first UE 428 (e.g., an LTE UE) may support the first RAT, but may not support the second RAT. Thus, the first UE 428 may be configured to monitor/decode first RAT signals (e.g., data 410 transmitted from the first base station 404) but not the second RAT signals. Similarly, a second UE 430 (e.g., an NR UE) may support the second RAT, but may not support the first RAT. Thus, the second UE 430 may be configured to monitor/decode second RAT signals (e.g., data 414 from the second base station 406) but not the first RAT signals. In some examples, a base station may indicate to a UE time and/or frequency resources that are configured for different RATs, such that the UE may monitor for time and/or frequency resources that correspond to the RAT is supports. For example, an NR base station (e.g., the base station 406) may indicate to an NR UE (e.g., the UE 430) of where the NR signals (e.g., the data 414) are mapped/allocated, e.g., via a higher-layer message such as radio resource control (RRC) signaling. Based on the indication, the NR UE may monitor for NR signals in a slot/subframe associated with DSS, and may skip monitoring non-NR signals in the slot/subframe. In other examples, a UE may not be aware that a transmission received/monitored is based on DSS. For example, an LTE UE may not have the capabilities to detect or know the presence of NR base station and/or NR UE on the same carrier as the LTE UE may not support the NR. Thus, an LTE base station (e.g., the base station 404) may not indicate to an LTE UE (e.g., the UE 428) of where the LTE signals (e.g., the data 410) are allocated.

While DSS may provide a more efficient and dynamic use of radio resources, such as for UEs operated with different RATs on the same or overlapped frequency spectrum, DSS operations may increase overhead signaling for control channels (e.g., physical downlink control channel (PDCCH)) and/or reference signals compared to non-DSS operations. For example, a UE may operate on 4G LTE or 5G NR, while a network entity may operate both 4G LTE and 5G NR on the same carrier.

Figure 6A:
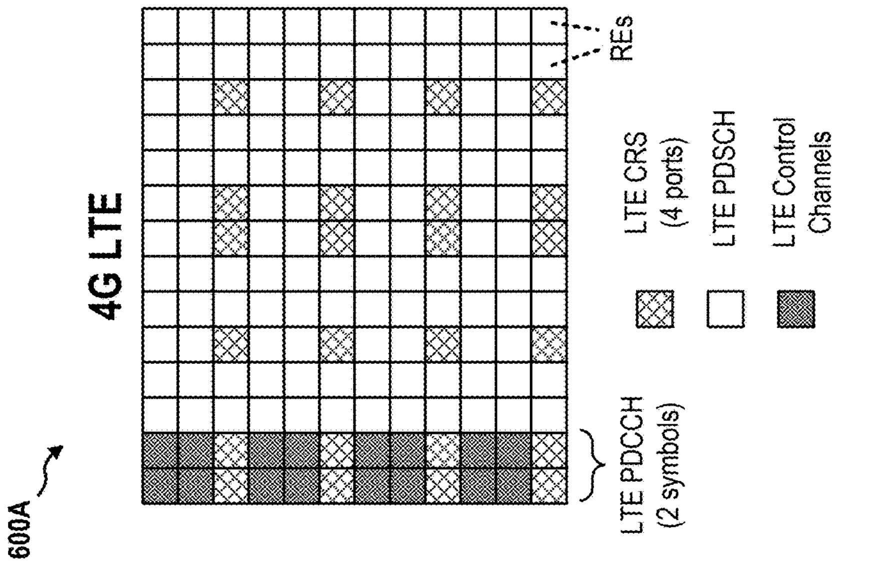
FIGS. 6A, 6B, and 6C are diagrams illustrating examples of control signals and reference signals overhead for 4G Long Term Evolution (LTE), 5G New Radio (NR), and DSS, respectively, in accordance with various aspects of the present disclosure.
Figure 6B:
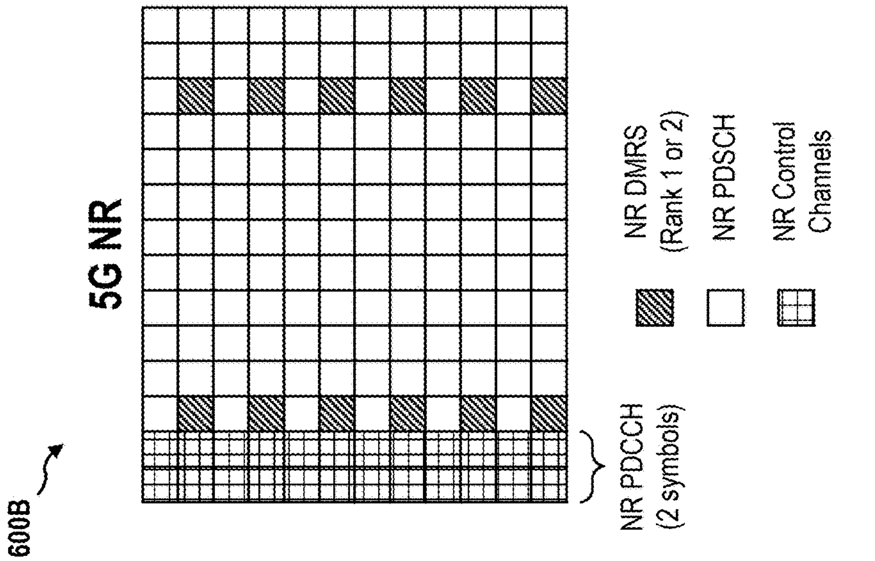
Figure 6C:
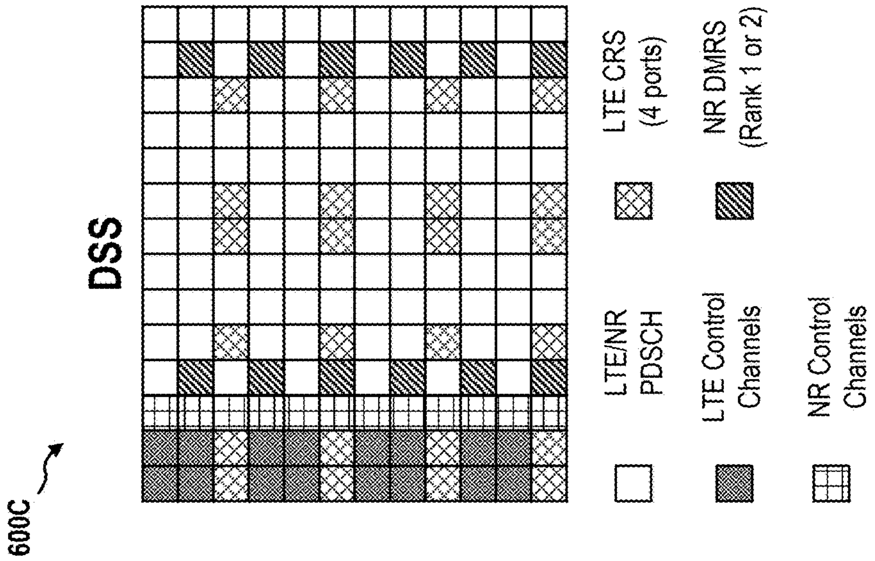

FIGS. 6A, 6B, and 6C are diagrams 600A, 600B, and 600C illustrating examples of control signals and reference signals overhead for 4G LTE, 5G NR, and DSS, respectively, in accordance with various aspects of the present disclosure. As shown by the diagram 600A, a slot or a subframe in a 4G LTE carrier may include a PDCCH that occupies two (2) symbols and multiple cell-specific reference signals (CRSs), which may provide approximately 128 available resource elements (REs) for transmitting data (e.g., for physical downlink shared channel (PDSCH)). Similarly, as shown by the diagram 600B, a slot or a subframe in a 5G NR carrier may include a PDCCH that occupies two (2) symbols and multiple demodulation reference signals (DMRSs), which may provide approximately 132 available REs for transmitting data. For example, 14 symbols with SCS at 15 kHz correspond to two slots in 4G LTE, but 1 slot in 5G NR.

On the other hand, as shown by the diagram 600C, a slot or a subframe in a DSS carrier may include LTE/NR PDCCH that occupies three (3) symbols and multiple LTE CRSs and NR DMRSs, which may provide approximately 92 available REs for transmitting data. Thus, the available REs in a slot for DSS may be much less than a 4G LTE slot/subframe and/or a 5G NR slot/subframe (e.g., more than 10% less). As such, the efficiency for DSS operations may be reduced when a higher number of control channels and/or reference signals (e.g., CRS and DMRS) is configured for slots associated with DSS.

LTE-CRS Based Rate-Matching or Puncturing for NR PDCCH

Aspects presented herein may enable a UE to monitor PDCCH candidate even when at least one RE of a PDCCH candidate on the serving cell overlaps with at least one RE of LTE CRS. For example, the present disclosure provides methods and techniques for a UE to handle PDCCH candidate handling, such as by adjusting NR PDCCH rate-matching/puncturing and/or PDCCH DMRS mapping in a DSS carrier.

According to aspect related to the present disclosure, for a transmission that is associated with DSS, a base station may be configured to map DMRS(s) (e.g., NR PDCCH DMRS) on symbol(s) where CRS(s) (e.g., LTE CRS) is not present. In other words, for symbol(s) where at least one RE of the DMRS(s) is to be punctured, the DMRS may not be allocated in these symbol(s). The network may determine DMRS mapping to comply with NR PDCCH rate-matching/puncturing and PDCCH DMRS mapping assumption if/when it overlaps with LTE CRS resource elements.

Figure 7:
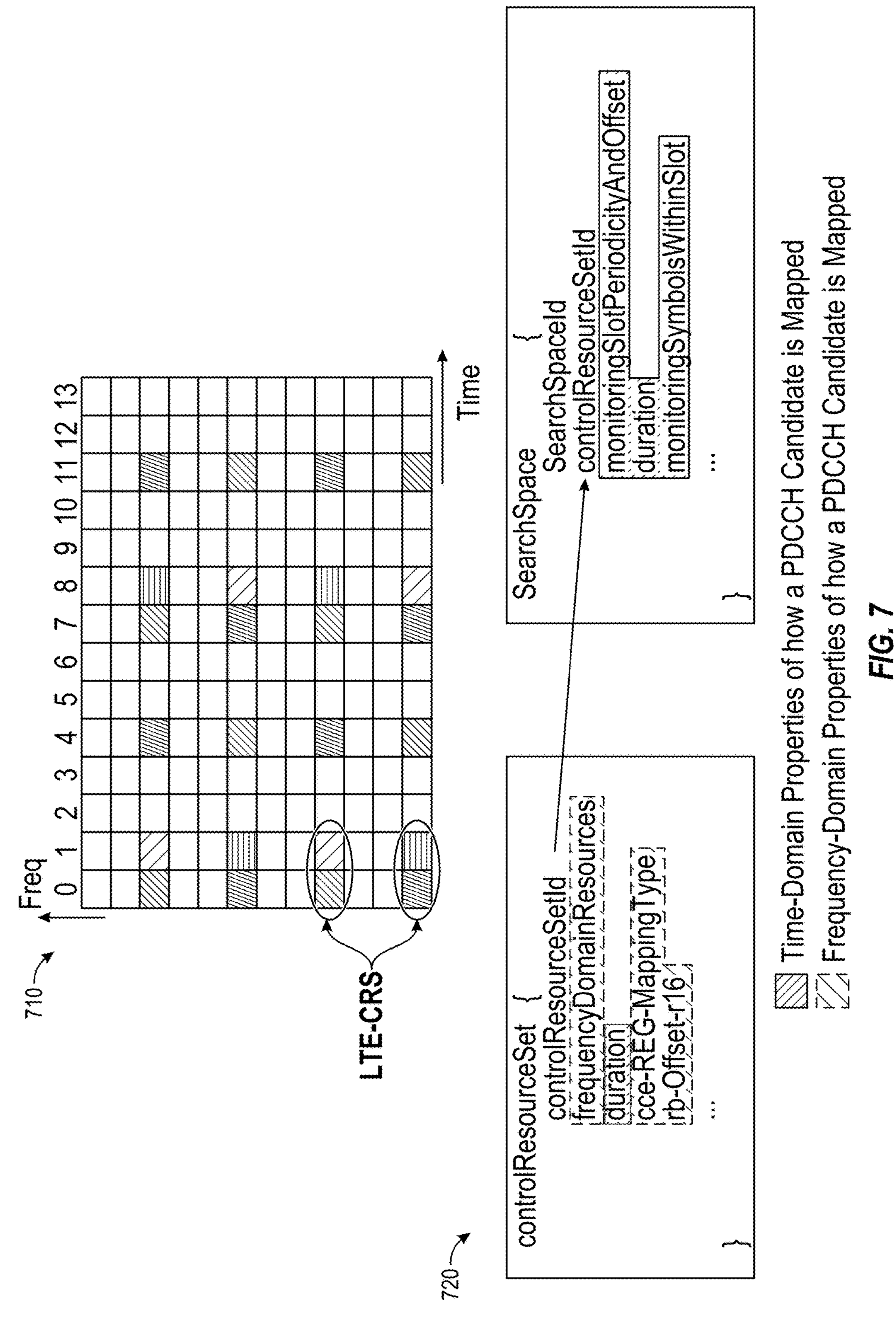
FIG. 7 illustrates a diagram of an example LTE-CRS pattern, in accordance with various aspects of the present disclosure.

FIG. 7 illustrates a diagram 710 of an example LTE-CRS pattern. In NR, a PDCCH candidate may span 1 to 3 OFDM symbol(s) of a slot depending on parameters configured for the search space (SearchSpace) and associated control resource set (controlResourceSet, or CORESET). As shown in diagram 710, on a downlink cell where LTE-CRS is transmitted with 4 ports, LTE-CRS REs are on OFDM symbol #0- #1, #4, #7-8, #11. For DSS operation on the cell, NR PDCCH candidate can span only OFDM symbols #2-#3, #5- #6, #9- #10, #12- #13. Therefore, NR-PDCCH candidate may be mapped on the OFDM symbols where LTE-CRS REs are not present.

As illustrated in the example code excerpt 720 in FIG. 7, resource mapping for a PDCCH candidate may be determined by parameters in SearchSpace and the associated controlResourceSet. Even for the same SearchSpace/controlResourceSet, multiple PDCCH monitoring occasions may be configured within a slot and distribute PDCCH candidates over them. For example, each of the multiple PDCCH monitoring occasions spans one or multiple consecutive OFDM symbols.

Figure 8:
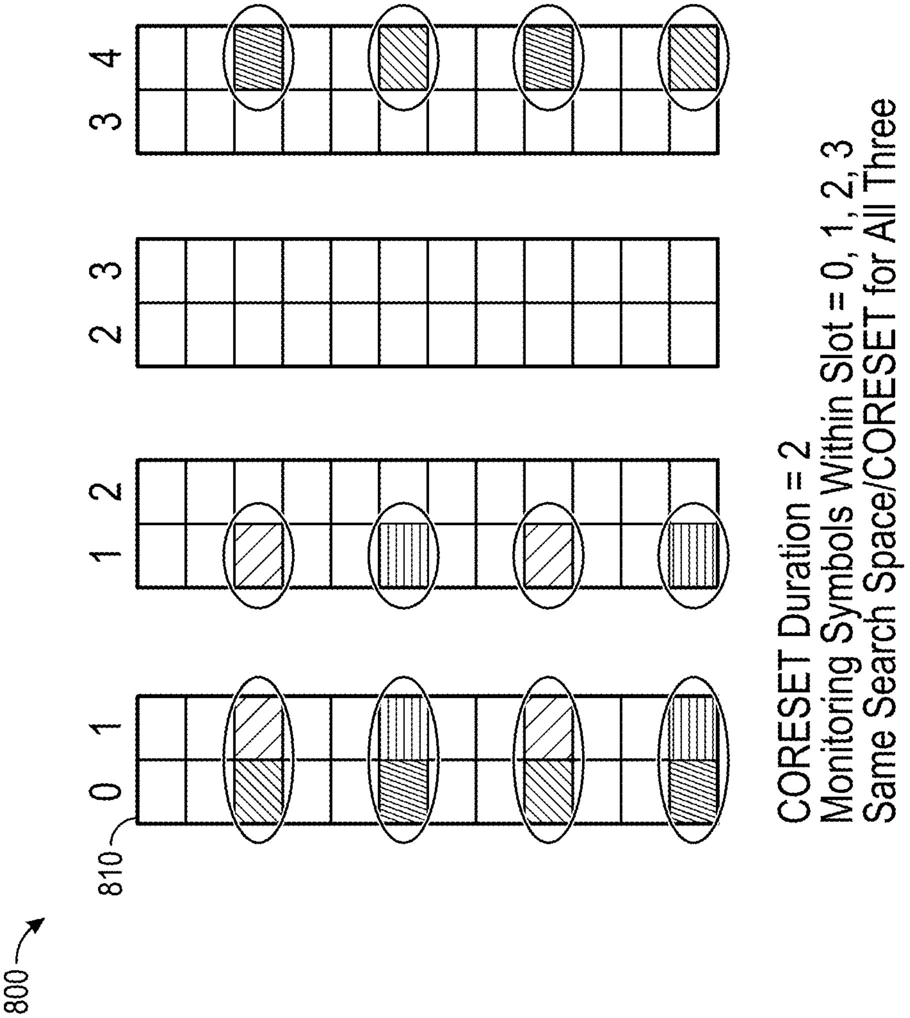
FIG. 8 illustrates example patterns for rate matching, puncturing, or demodulation reference signal (DMRS) adjustment, in accordance with various aspects of the present disclosure.

FIG. 8 illustrates example patterns 800 for rate matching, puncturing, or demodulation reference signal (DMRS) adjustment, in accordance with various aspects of the present disclosure. As shown, for the same SearchSpace orcontrolResourceSet, a UE may apply NR PDCCH rate-matching and/or puncturing and NR PDCCH DMRS adjustment for avoiding LTE-CRS REs, which may depend on whether the monitoring occasion for the PDCCH candidate overlaps with LTE-CRS RE(s). For example, if a monitoring occasion 810 spans at least one OFDM symbol from #0, #1, #4, #7, #8, #11, NR PDCCH rate-matching/puncturing and NR PDCCH DMRS adjustment for avoiding LTE-CRS REs can be applied.

As shown by the various patterns 800, depending on which set of OFDM symbol(s) the monitoring occasion spans, the rate-matching/puncturing and DMRS adjustment patterns may be different. For example, when the CORESET duration is set to 2 symbols, different patterns may be used to rate-match or puncture. For the same SearchSpace or controlResourceSet, PDCCH or DMRS adjustment can be different depending on which OFDM symbols the PDCCH candidate spans over.

The position of LTE-CRS REs may be identified by RRC parameter(s) configured for the serving cell or for the DL BWP (e.g., lte-CRS-ToMatchAround or lte-CRS-PatternList1-r16/lte-CRS-PatternList1-r16 in ServingCellConfig). As such, the LTE-CRS REs can be taken into account for all or some search space/CORESET. In some cases, RRC signaling may configure which search space/CORESET to take into account.

Figure 9:
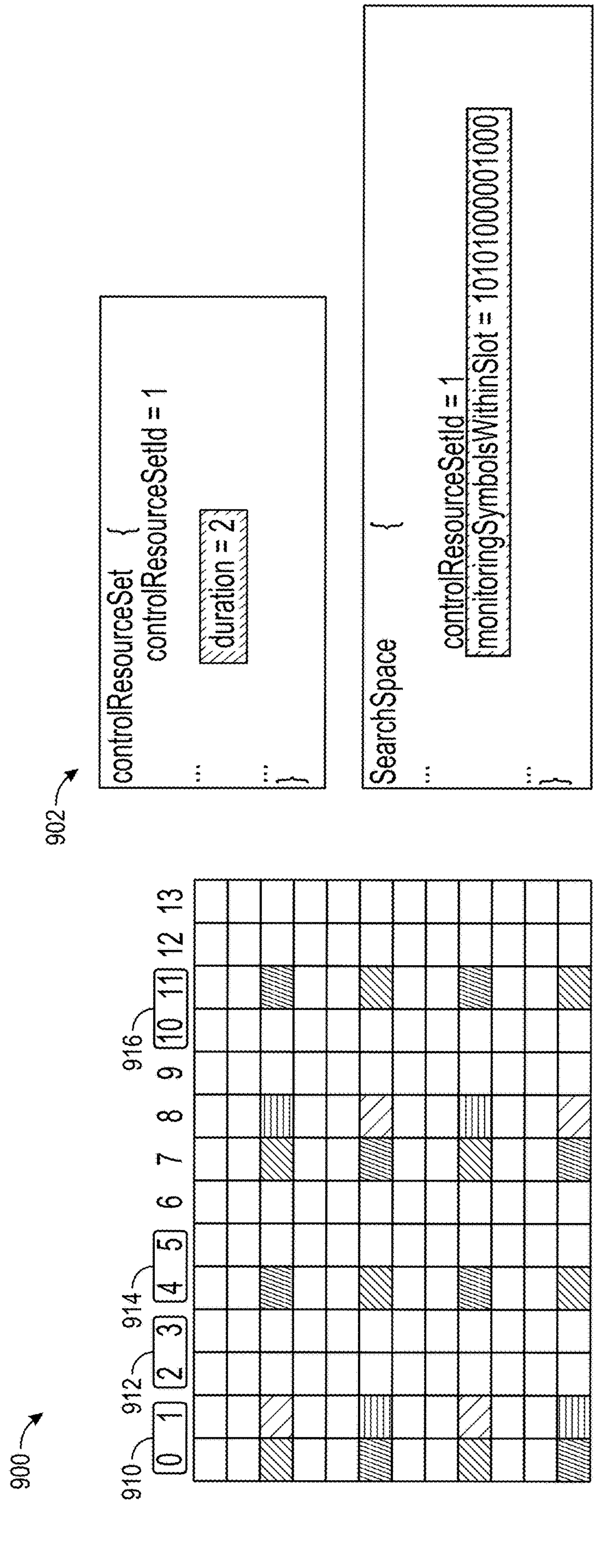
FIG. 9 illustrates patterns of monitoring occasions based on a same search space or control resource set, in accordance with various aspects of the present disclosure.

FIG. 9 illustrates patterns of monitoring occasions 900 based on a same search space or control resource set, in accordance with various aspects of the present disclosure. As shown in the example code excerpt 902, for the same SearchSpace and/or controlResourceSet, the UE may apply NR PDCCH rate-matching and/or puncturing and NR PDCCH DMRS adjustment for avoiding LTE-CRS REs, which may depend on whether the monitoring occasion for the PDCCH candidate overlaps with LTE-CRS RE(s). The four monitoring occasions 910, 912, 914, and 916 are based on the same search space or CORESET, while the monitoring occasions have different patterns.

Figure 10:
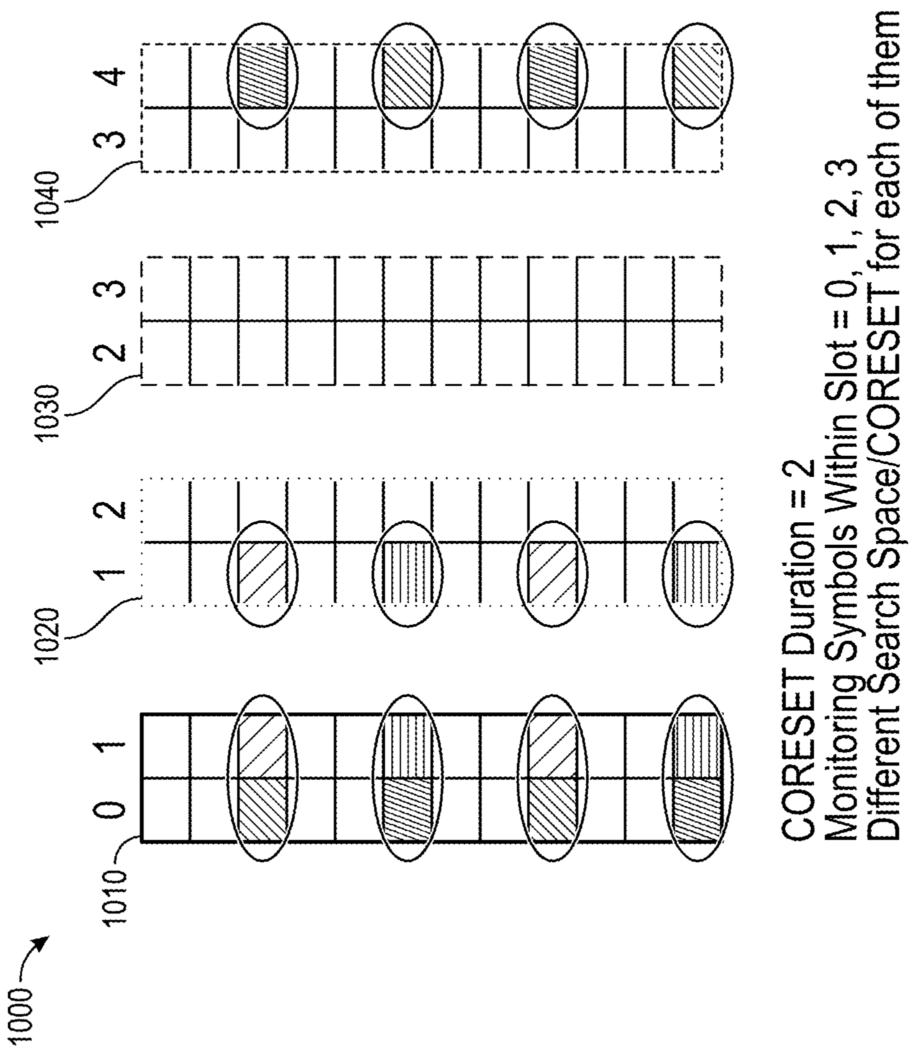
FIG. 10 illustrates example patterns for rate matching, puncturing, or DMRS adjustment, in accordance with various aspects of the present disclosure.

FIG. 10 illustrates example patterns 1000 for rate matching, puncturing, or DMRS adjustment, in accordance with various aspects of the present disclosure. Compared to FIG. 8, FIG. 10 illustrates different search spaces or CORESETs as opposed to the same search space or CORESET in FIG. 8. As shown, for the same SearchSpace and/or controlResourceSet, NR PDCCH rate-matching/puncturing and NR PDCCH DMRS adjustment for avoiding LTE-CRS REs may be common or the same across monitoring occasions in a slot (e.g., each monitoring occasion 1010, 1020, 1030, and 1040 may be the same in a slot). That is, there is no more than one rate-matching/puncturing/adjustment pattern across PDCCH monitoring occasions for a given search space/CORESET.

In some cases, the network entity may still configure multiple search space/CORESET that has different rate-matching/puncturing/adjustment patterns. By configuring multiple sets of search spaces or CORESETs, the UE may have multiple monitoring occasions on overlapping/non-overlapping OFDM symbols. As such, the rate-matching/puncturing/adjustment pattern/behavior can be configured per search space/CORESET.

Figure 11:
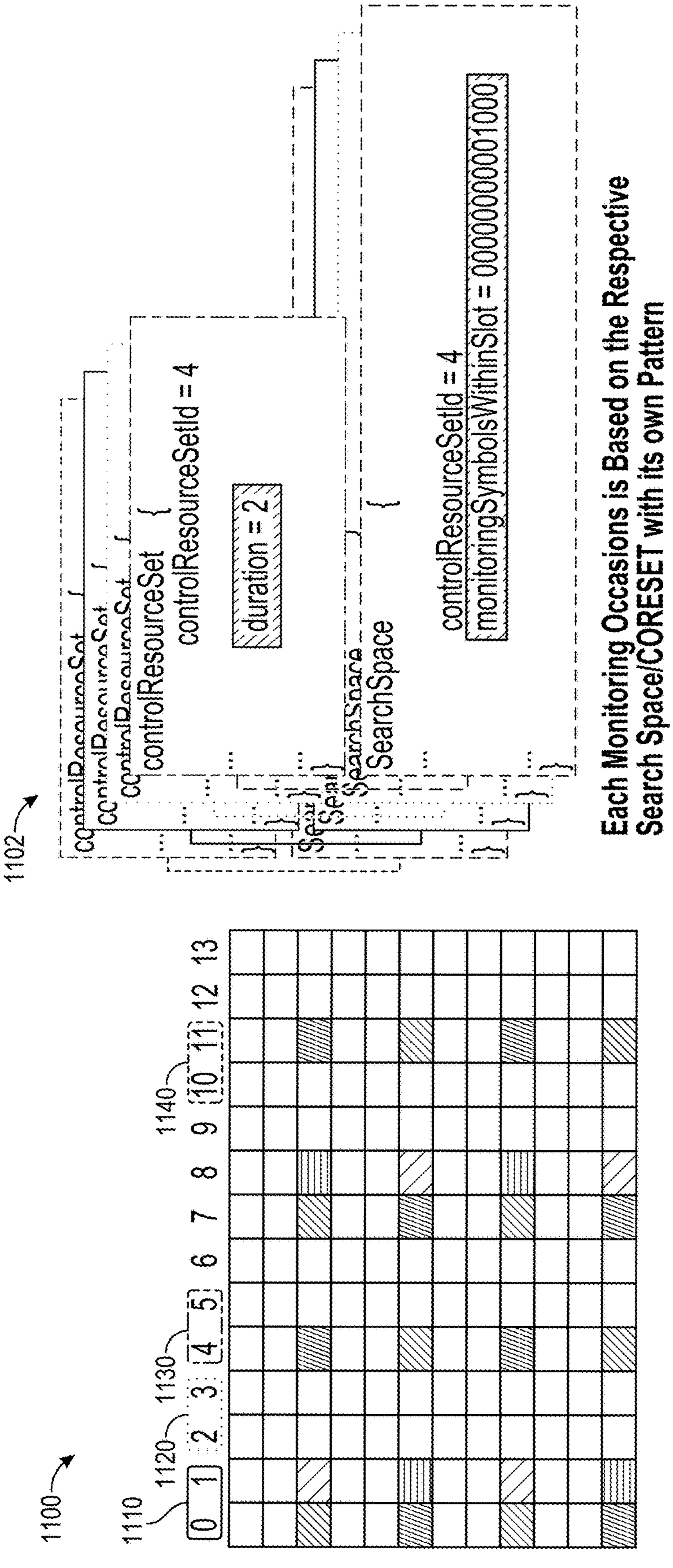
FIG. 11 illustrates patterns of monitoring occasions having respective patterns, in accordance with various aspects of the present disclosure.

FIG. 11 illustrates patterns of monitoring occasions 1100 having respective patterns, in accordance with various aspects of the present disclosure. As shown, for the same SearchSpace and/or controlResourceSet, the UE may apply NR PDCCH rate-matching/puncturing and NR PDCCH DMRS adjustment for avoiding LTE-CRS RES, which may be common across monitoring occasions in a slot. For example, as shown in the example code excerpt 1102, each monitoring occasion is based on the respective search space or CORESET with a respective pattern (e.g., 1110, 1120, 1130, and 1140, boundary line types of a pattern corresponds to the same boundary line types of the example code excerpt 1102).

Figure 12:
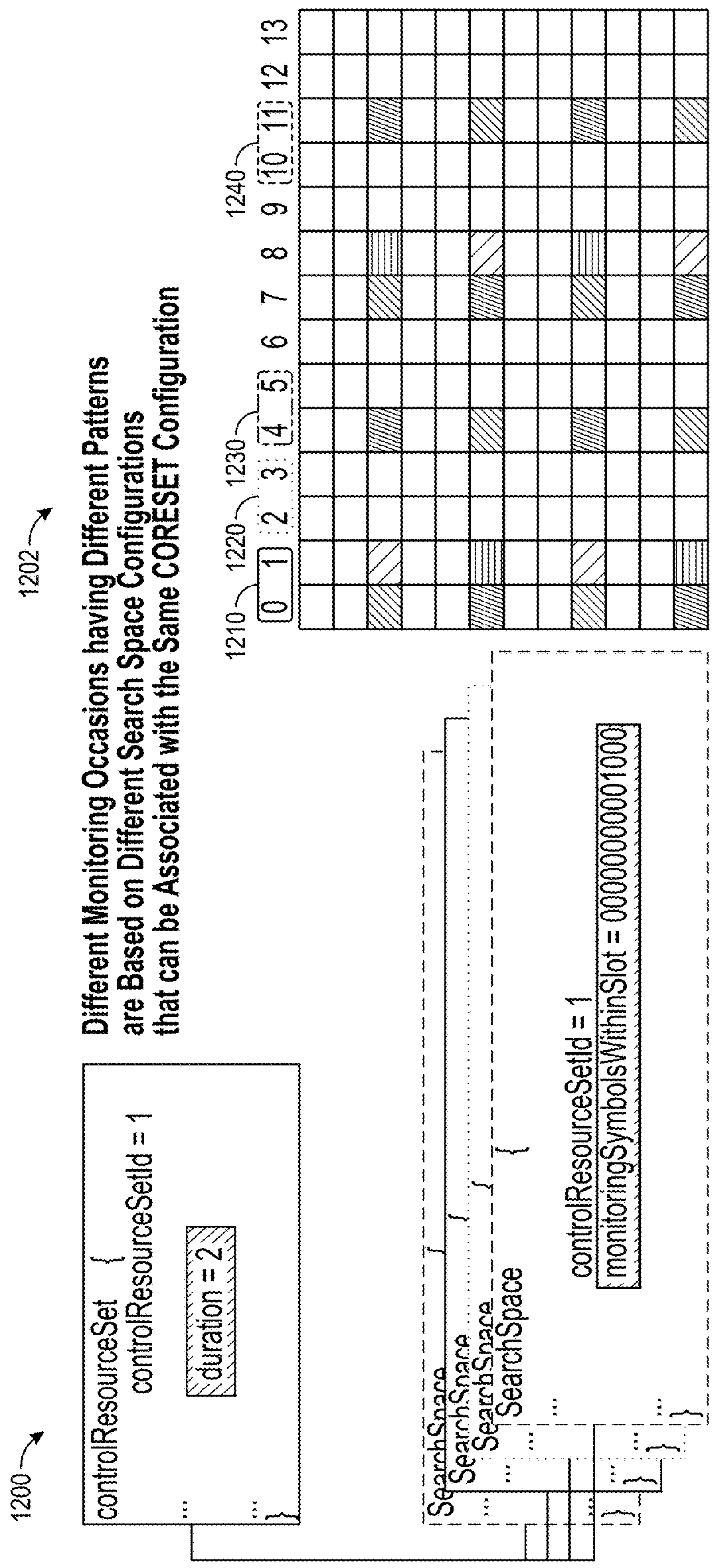
FIG. 12 illustrates patterns of different monitoring occasions having different patterns, in accordance with various aspects of the present disclosure.

FIG. 12 illustrates patterns 1200 of different monitoring occasions 1202 having different patterns, in accordance with various aspects of the present disclosure. As shown, for the same SearchSpace and/or controlResourceSet, a UE may apply NR PDCCH rate-matching or puncturing and/or NR PDCCH DMRS adjustment for avoiding LTE-CRS REs, which may be common/same across monitoring occasions (e.g., 1210, 1220, 1230, and 1240) in a slot. Different monitoring occasions may have different patterns that are based on different search space configurations that can be associated with the same CORESET configuration.

Figure 13:
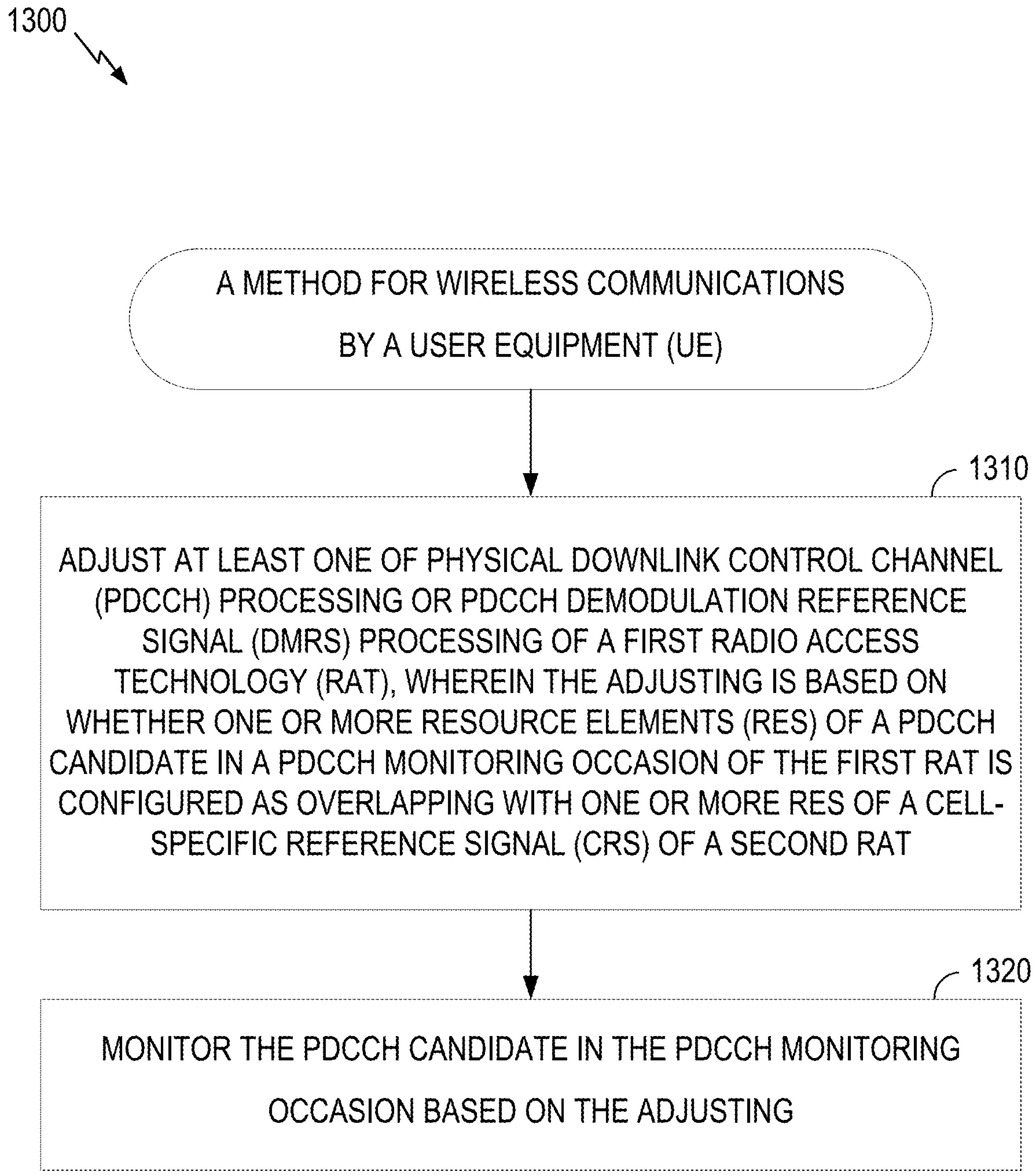
FIG. 13 shows an example method for adjusting PDCCH processing or PDCCH DMRS processing, in accordance with various aspects of the present disclosure.

FIG. 13 shows an example method for adjusting PDCCH processing or PDCCH DMRS processing, in accordance with various aspects of the present disclosure. In some aspects, a UE, such as the UE 104 of FIGS. 1 and 2, or processing system 1405 of FIG. 14, may perform the method 1300.

At operation 1310, the UE adjusts at least one of PDCCH processing or PDCCH DMRS processing of a first radio access technology (RAT), such as 4G LTE. The adjusting is based on whether one or more resource elements (REs) of a PDCCH candidate in a PDCCH monitoring occasion of the first RAT is configured as overlapping with one or more REs of a cell-specific reference signal (CRS) of a second RAT, such as 5G NR. For example, adjusting at least one of the PDCCH processing or the PDCCH DMRS processing comprises at least one of: mapping a number of modulated symbols from coded bits to resources available for PDCCH transmission (e.g., at least one of rate-matching, shortening, puncturing, or repetition of the coded bits); or adjusting a configuration of the DMRS, the configuration related to at least a DMRS symbol position in a slot.

At operation 1320, the UE monitors the PDCCH candidate in the PDCCH monitoring occasion based on the adjusting.

In some cases, the UE may adjust at least one of the PDCCH processing or the PDCCH DMRS processing when the PDCCH monitoring occasion spans over at least one orthogonal frequency division multiplexing (OFDM) symbol at one or more predefined symbols in a slot. In some cases, adjusting at least one of the PDCCH processing or the PDCCH DMRS processing depends on which of the one or more predefined symbols the PDCCH monitoring occasion spans on (as shown in FIG. 8).

According to certain aspects of the present disclosure, for a given CORESET or search space, whether to apply LTE-CRS rate-matching or puncturing can be configured by RRC. For example, both rate-matching and puncturing may be supported. The network entity may configure the UE to apply one of, or both rate-matching and puncturing. For a given CORESET or search space, LTE-CRS rate-matching or puncturing pattern may apply to all the PRBs of the CORESET/search space, or to a subset of PRBs of the CORESET/search space.

In some cases, a UE can be configured with two CORESET/search space having PDCCH monitoring occasion on the same set of OFDM symbol(s), where LTE-CRS rate-matching or puncturing is configured on one CORESET or search space and is not configured on the other CORESET or search space.

In some cases, the UE may monitor PDCCH candidates associated to two CORESETs or search spaces, as the network entity may send a PDCCH on either one of them.

In some cases, LTE-CRS rate matching or puncturing can be enabled dynamically, such as in a blind decoding nature.

In some cases, a UE may report the number of rate-matching or puncturing adjustment patterns the UE supports per downlink cell or bandwidth part (BWP).

Example Wireless Communication Devices

Figure 14:
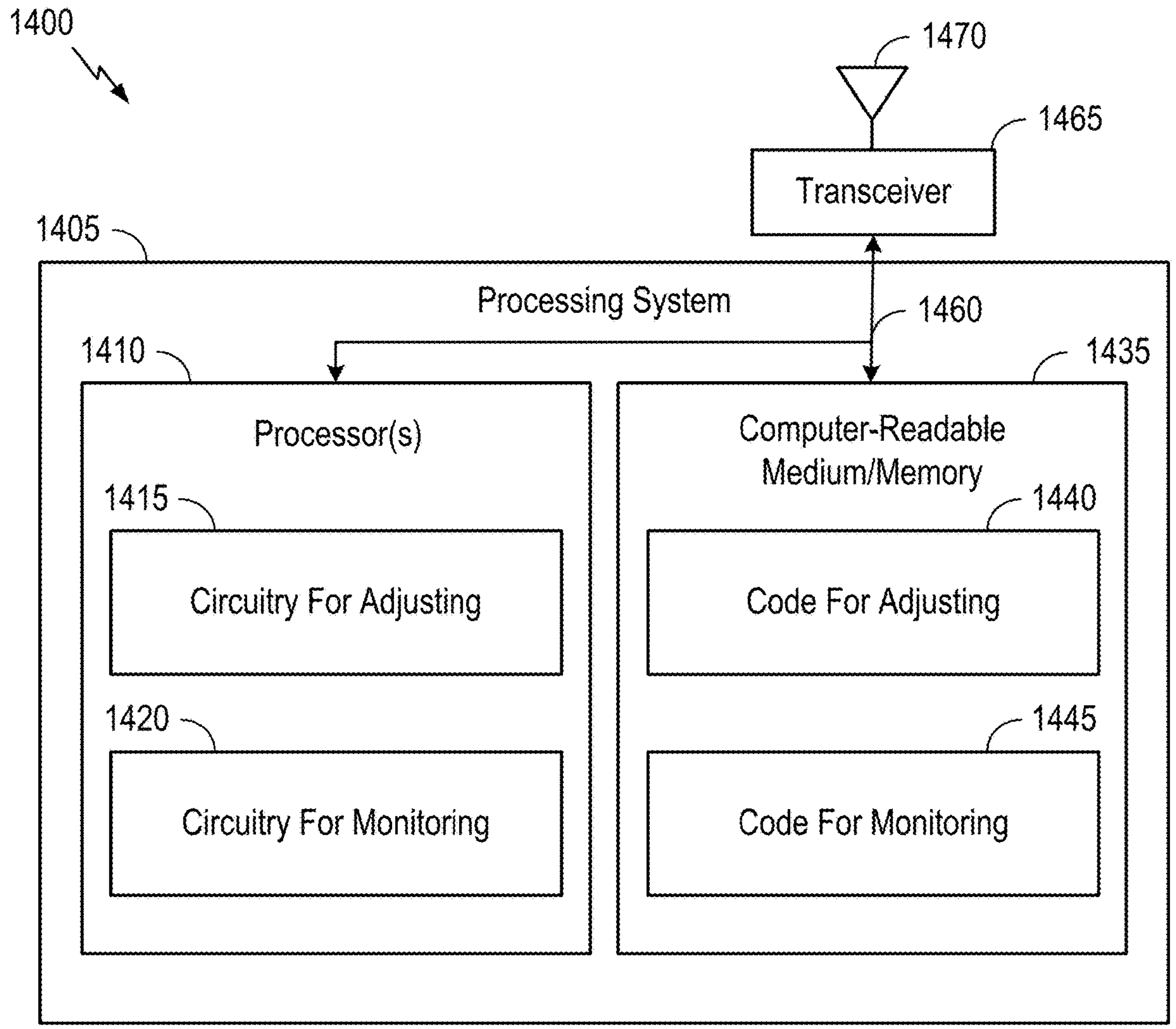
FIG. 14 depicts aspects of an example communications device.

FIG. 14 depicts an example communications device 1400 that includes various components operable, configured, or adapted to perform operations for the techniques disclosed herein, such as the operations depicted and described with respect to FIG. 13. In some examples, communication device 1400 may be a UE 104 as described, for example with respect to FIGS. 1 and 2.

Communications device 1400 includes a processing system 1402 coupled to a transceiver 1465 (e.g., a transmitter and/or a receiver). Transceiver 1465 is configured to transmit (or send) and receive signals for the communications device 1400 via an antenna 1470, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1460. In certain aspects, computer-readable medium/memory 1430 is configured to store instructions (e.g., computer-executable code) that when executed by the one or more processors 1420, cause the one or more processors 1420 to perform the operations illustrated in FIG. 13, or other operations for performing the various techniques discussed herein for adjusting at least one of PDCCH processing or PDCCH DMRS processing.

In the depicted example, computer-readable medium/memory 1435 stores code 1440 for adjusting, and code 1445 for monitoring.

In the depicted example, the one or more processors 1410 include circuitry configured to implement the code stored in the computer-readable medium/memory 1435, including circuitry 1415 for adjusting, and circuitry 1420 for monitoring.

Various components of communications device 1400 may provide means for performing the methods described herein, including with respect to FIG. 13.

In some examples, means for transmitting or sending (or means for outputting for transmission) may include the transceivers 254 and/or antenna(s) 252 of the UE 104 illustrated in FIG. 2 and/or transceiver 1465 and antenna 1470 of the communication device 1400 in FIG. 14.

In some examples, means for receiving (or means for monitoring) may include the transceivers 254 and/or antenna (s) 252 of the UE 104 illustrated in FIG. 2 and/or transceiver 1465 and antenna 1470 of the communication device 1400 in FIG. 14.

In some examples, means for adjusting may include various processing system components, such as: the one or more processors 1420 in FIG. 14, or aspects of the UE 104 depicted in FIG. 2, including receive processor 258, transmit processor 264, TX MIMO processor 266, and/or controller/processor 280 (including mapping and adjusting component 281).

Notably, FIG. 14 is an example, and many other examples and configurations of communication device 1400 are possible.

Example Clauses

Implementation examples are described in the following numbered clauses:

Clause 1: A method for wireless communications by a user equipment (UE), comprising: adjusting at least one of physical downlink control channel (PDCCH) processing or PDCCH demodulation reference signal (DMRS) processing of a first radio access technology (RAT), wherein the adjusting is based on whether one or more resource elements (REs) of a PDCCH candidate in a PDCCH monitoring occasion of the first RAT is configured as overlapping with one or more REs of a cell-specific reference signal (CRS) of a second RAT; and monitoring the PDCCH candidate in the PDCCH monitoring occasion based on the adjusting.

Clause 2: The method of Clause 1, wherein adjusting at least one of the PDCCH processing or the PDCCH DMRS processing comprises at least one of: mapping a number of modulated symbols from coded bits to resources available for PDCCH transmission; or adjusting a configuration of the DMRS, the configuration related to at least a DMRS symbol position in a slot.

Clause 3: The method of Clause 2, wherein mapping the number of modulated symbols from coded bits comprises at least one of rate-matching, shortening, puncturing, or repetition of the coded bits.

Clause 4: The method of Clause 3, further comprising: adjusting at least one of the PDCCH processing or the PDCCH DMRS processing when the PDCCH monitoring occasion spans over at least one orthogonal frequency division multiplexing (OFDM) symbol at one or more predefined symbols in a slot.

Clause 5: The method of Clause 4, wherein adjusting at least one of the PDCCH processing or the PDCCH DMRS processing depends on which of the one or more predefined symbols the PDCCH monitoring occasion spans on.

Clause 6: The method of Clause 1, further comprising: receiving one or more radio resource control (RRC) parameters configured for a serving cell or for a downlink bandwidth part (BWP); and identifying a position of at least one of the one or more REs of the CRS of the second RAT based on the one or more RRC parameters.

Clause 7: The method of Clause 1, further comprising: identifying the one or more REs of the CRS of the second RAT based on a search space or a control resource set (CORESET).

Clause 8: The method of Clause 7, wherein adjusting at least one of the PDCCH processing or the PDCCH DMRS processing is performed for a same search space or CORESET.

Clause 9: The method of Clause 1, wherein adjusting at least one of the PDCCH processing or the PDCCH DMRS processing comprises applying a same adjustment pattern for a same search space or control resource set (CORESET).

Clause 10: The method of Clause 9, further comprising: receiving, from a network entity, signaling that configures two or more sets of search spaces or CORESETs; adjusting at least one of the PDCCH processing or the PDCCH DMRS processing for each of the two or more sets of search spaces or CORESETs; and monitoring the PDCCH candidate across multiple monitoring occasions in a slot.

Clause 11: The method of Clause 1, further comprising: receiving a radio resource control (RRC) message from a network entity; and adjusting at least one of the PDCCH processing or the PDCCH DMRS processing on RRC message.

Clause 12: The method of Clause 1, wherein adjusting at least one of the PDCCH processing or the PDCCH DMRS processing is applicable to one or more physical resource blocks (PRBs) of a given search space or control resource set (CORESET).

Clause 13: The method of Clause 1, further comprising: receiving, from a network entity, an indication configuring two sets of search spaces or control resource sets (CORESETs), each having a PDCCH monitoring occasion on one at least partially overlapping common set of orthogonal frequency division multiplexing (OFDM) symbols; and adjusting at least one of the PDCCH processing or the PDCCH DMRS processing on one of the two sets of search spaces or CORESETs but not on the other.

Clause 14: The method of Clause 1, further comprising: reporting a number of adjustment patterns supported by the UE per downlink cell or per downlink bandwidth part (BWP) for adjusting at least one of the PDCCH processing or the PDCCH DMRS processing.

Clause 15: A apparatus for wireless communications, comprising: a memory; and a processor coupled with the memory, the processor and the memory configured to: adjust at least one of physical downlink control channel (PDCCH) processing or PDCCH demodulation reference signal (DMRS) processing of a first radio access technology (RAT), wherein the adjusting is based on whether one or more resource elements (REs) of a PDCCH candidate in a PDCCH monitoring occasion of the first RAT is configured as overlapping with one or more REs of a cell-specific reference signal (CRS) of a second RAT; and monitor the PDCCH candidate in the PDCCH monitoring occasion based on the adjusting.

Clause 16: The apparatus of Clause 15, wherein the processor and the memory are configured to adjust at least one of the PDCCH processing or the PDCCH DMRS processing by at least one of: mapping a number of modulated symbols from coded bits to resources available for PDCCH transmission; or adjusting a configuration of the DMRS, the configuration related to at least a DMRS symbol position in a slot.

Clause 17: The apparatus of Clause 16, wherein the memory and the processor are configured to map the number of modulated symbols from coded bits by at least one of rate-matching, shortening, puncturing, or repetition of the coded bits.

Clause 18: The apparatus of Clause 17, wherein the memory and the processor are further configured to adjust at least one of the PDCCH processing or the PDCCH DMRS processing when the PDCCH monitoring occasion spans over at least one orthogonal frequency division multiplexing (OFDM) symbol at one or more predefined symbols in a slot.

Clause 19: The apparatus of Clause 18, wherein the memory and the processor are configured to adjust at least one of the PDCCH processing or the PDCCH DMRS processing based on which of the one or more predefined symbols the PDCCH monitoring occasion spans on.

Clause 20: The apparatus of Clause 15, wherein the memory and the processor are further configured to: receive one or more radio resource control (RRC) parameters configured for a serving cell or for a downlink bandwidth part (BWP); and identify a position of at least one of the one or more REs of the CRS of the second RAT based on the one or more RRC parameters.

Clause 21: The apparatus of Clause 15, wherein the memory and the processor are further configured to identify the one or more REs of the CRS of the second RAT based on a search space or a control resource set (CORESET).

Clause 22: The apparatus of Clause 21, wherein the memory and the processor are configured to adjust at least one of the PDCCH processing or the PDCCH DMRS processing for a same search space or CORESET.

Clause 23: The apparatus of Clause 15, wherein the memory and the processor are configured to adjust at least one of the PDCCH processing or the PDCCH DMRS processing by applying a same adjustment pattern for a same search space or control resource set (CORESET).

Clause 24: The apparatus of Clause 23, wherein the memory and the processor are further configured to: receive, from a network entity, signaling that configures two or more sets of search spaces or CORESETs; adjust at least one of the PDCCH processing or the PDCCH DMRS processing for each of the two or more sets of search spaces or CORESETs; and monitor the PDCCH candidate across multiple monitoring occasions in a slot.

Clause 25: The apparatus of Clause 15, wherein the memory and the processor are further configured to: receive a radio resource control (RRC) message from a network entity; and adjust at least one of the PDCCH processing or the PDCCH DMRS processing on RRC message.

Clause 26: The apparatus of Clause 15, wherein the processor and the memory are configured to adjust at least one of the PDCCH processing or the PDCCH DMRS processing to one or more physical resource blocks (PRBs) of a given search space or control resource set (CORESET).

Clause 27: The apparatus of Clause 15, wherein the processor and the memory are further configure to: receive, from a network entity, an indication configuring two sets of search spaces or control resource sets (CORESETs), each having a PDCCH monitoring occasion on one at least partially overlapping common set of orthogonal frequency division multiplexing (OFDM) symbols; and adjust at least one of the PDCCH processing or the PDCCH DMRS processing on one of the two sets of search spaces or CORESETs but not on the other.

Clause 28: The apparatus of Clause 15, wherein the processor and the memory are further configure to report a number of adjustment patterns supported by the UE per downlink cell or per downlink bandwidth part (BWP) for adjusting at least one of the PDCCH processing or the PDCCH DMRS processing.

Clause 29: A non-transitory computer readable medium storing instructions that when executed by a user equipment (UE) cause the UE to: adjust at least one of physical downlink control channel (PDCCH) processing or PDCCH demodulation reference signal (DMRS) processing of a first radio access technology (RAT), wherein the adjusting is based on whether one or more resource elements (REs) of a PDCCH candidate in a PDCCH monitoring occasion of the first RAT is configured as overlapping with one or more REs of a cell-specific reference signal (CRS) of a second RAT; and monitor the PDCCH candidate in the PDCCH monitoring occasion based on the adjusting.

Clause 30: An apparatus for wireless communications, comprising: means for adjusting at least one of physical downlink control channel (PDCCH) processing or PDCCH demodulation reference signal (DMRS) processing of a first radio access technology (RAT), wherein the adjusting is based on whether one or more resource elements (REs) of a PDCCH candidate in a PDCCH monitoring occasion of the first RAT is configured as overlapping with one or more REs of a cell-specific reference signal (CRS) of a second RAT;

and means for monitoring the PDCCH candidate in the PDCCH monitoring occasion based on the adjusting.

Clause 31: An apparatus, comprising: a memory comprising executable instructions; and one or more processors configured to execute the executable instructions and cause the apparatus to perform a method in accordance with any one of Clauses 1-14.

Clause 32: An apparatus, comprising means for performing a method in accordance with any one of Clauses 1-14.

Clause 33: A non-transitory computer-readable medium comprising executable instructions that, when executed by one or more processors of an apparatus, cause the apparatus to perform a method in accordance with any one of Clauses 1-14.

Clause 34: A computer program product embodied on a computer-readable storage medium comprising code for performing a method in accordance with any one of Clauses 1-14.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term “cell” can refer to a coverage area of a NodeB and/or a narrowband subsystem serving this coverage area, depending on the context in which the term is used. In NR systems, the term “cell” and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mm Wave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100*x* is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of a UE adjusting at least one of PDCCH processing or PDCCH DMRS processing under certain conditions in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a user equipment (UE), comprising:

receiving, from a network entity, one or more radio resource control (RRC) parameters, the one or more RRC parameters including configuration information indicating whether to apply rate matching or puncturing for a physical downlink control channel (PDCCH) candidate; and monitoring, based on the one or more RRC parameters, the PDCCH candidate of a first radio access technology (RAT) when at least one resource element (RE) of the PDCCH candidate overlaps with at least one RE of a cell-specific reference signal (CRS) of a second RAT, wherein monitoring the PDCCH candidate comprises applying the rate matching or the puncturing to the PDCCH candidate in accordance with the configuration information.

2. The method of claim 1, further comprising:

receiving the one or more RRC parameters configured for a serving cell; and identifying a position of at least one RE of the at least one RE of the CRS of the second RAT based on the one or more RRC parameters.

3. An apparatus for wireless communication, comprising:

a processing system configured to:

receive, from a network entity, one or more radio resource control (RRC) parameters, the one or more RRC parameters including configuration information indicating whether to apply rate matching or puncturing for a physical downlink control channel (PDCCH) candidate; and monitor, based on the one or more RRC parameters, the PDCCH candidate of a first radio access technology (RAT) when at least one resource element (RE) of the PDCCH candidate overlaps with at least one RE of a cell-specific reference signal (CRS) of a second RAT, wherein, to monitor the PDCCH candidate, the processing system is configured to apply the rate matching or the puncturing to the PDCCH candidate in accordance with the configuration information.

4. The apparatus of claim 3, wherein the processing system is configured to:

receive the one or more RRC parameters configured for a serving cell; and identify a position of at least one RE of the at least one RE of the CRS of the second RAT based on the one or more RRC parameters.

5. A non-transitory computer readable medium having instructions stored thereon that, when executed by a user equipment (UE), cause the UE to:

receive, from a network entity, one or more radio resource control (RRC) parameters, the one or more RRC parameters including configuration information indicating whether to apply rate matching or puncturing for a physical downlink control channel (PDCCH) candidate; and monitor, based on the one or more RRC parameters, the PDCCH candidate of a first radio access technology (RAT) when at least one resource element (RE) of the PDCCH candidate overlaps with at least one RE of a cell-specific reference signal (CRS) of a second RAT, wherein the instructions that cause the UE to monitor the PDCCH candidate comprise instructions that cause the UE to apply the rate matching or the puncturing to the PDCCH candidate in accordance with the configuration information.

6. An apparatus for wireless communication, comprising:

means for receiving, from a network entity, one or more radio resource control (RRC) parameters, the one or more RRC parameters including configuration information indicating whether to apply rate matching or puncturing for a physical downlink control channel (PDCCH) candidate; and means for monitoring, based on the one or more RRC parameters, the PDCCH candidate of a first radio access technology (RAT) when at least one resource element (RE) of the PDCCH candidate overlaps with at least one RE of a cell-specific reference signal (CRS) of a second RAT, wherein the means for monitoring the PDCCH candidate comprises means for applying the rate matching or the puncturing to the PDCCH candidate in accordance with the configuration information.

7. The method of claim 1, wherein the first RAT is a long term evolution (LTE) RAT and the second RAT is a new radio (NR) RAT.

8. The method of claim 1, wherein the one or more RRC parameters include lte-CRS-ToMatchAround.

9. The method of claim 1, wherein the one or more RRC parameters include lte-CRS-ToMatchAround in ServingCellConfig.

10. The method of claim 1, wherein the one or more RRC parameters include lte-CRS-PatternList1.

11. The method of claim 1, wherein the one or more RRC parameters include lte-CRS-PatternList1 in ServingCellConfig.

12. The method of claim 1, wherein the one or more RRC parameters are configured for a serving cell, and wherein monitoring, based on the one or more RRC parameters, the PDCCH candidate comprises: monitoring, based on the one or more RRC parameters, the PDCCH candidate when the at least one RE of the PDCCH candidate on the serving cell overlaps with the at least one RE of the CRS of the second RAT.

13. The method of claim 1, wherein monitoring, based on the one or more RRC parameters, the PDCCH candidate comprises: monitoring, based on the one or more RRC parameters, the PDCCH candidate when the at least one RE of the PDCCH candidate in a PDCCH monitoring occasion of the first RAT overlaps with the at least one RE of the CRS of the second RAT.

14. The method of claim 13, wherein the PDCCH monitoring occasion spans over at least one orthogonal frequency division multiplexing (OFDM) symbol at one or more predefined symbols in a slot.

15. The apparatus of claim 3, wherein the first RAT is a long term evolution (LTE) RAT and the second RAT is a new radio (NR) RAT.

16. The apparatus of claim 3, wherein the one or more RRC parameters include lte-CRS-ToMatchAround.

17. The apparatus of claim 3, wherein the one or more RRC parameters include lte-CRS-ToMatchAround in ServingCellConfig.

18. The apparatus of claim 3, wherein the one or more RRC parameters include lte-CRS-PatternList1.

19. The apparatus of claim 3, wherein the one or more RRC parameters include lte-CRS-PatternList1 in ServingCellConfig.

20. The apparatus of claim 3, wherein the one or more RRC parameters are configured for a serving cell, and wherein, to monitor, based on the one or more RRC parameters, the PDCCH candidate, the processing system is configured to: monitor, based on the one or more RRC parameters, the PDCCH candidate when the at least one RE of the PDCCH candidate on the serving cell overlaps with the at least one RE of the CRS of the second RAT.

21. The apparatus of claim 3, wherein, to monitor, based on the one or more RRC parameters, the PDCCH candidate, the processing system is configured to: monitor, based on the one or more RRC parameters, the PDCCH candidate when the at least one RE of the PDCCH candidate in a PDCCH monitoring occasion of the first RAT overlaps with the at least one RE of the CRS of the second RAT.

22. The apparatus of claim 21, wherein the PDCCH monitoring occasion spans over at least one orthogonal frequency division multiplexing (OFDM) symbol at one or more predefined symbols in a slot.

* * * * *